(12) United States Patent
Nobuta et al.

(10) Patent No.: US 7,309,544 B2
(45) Date of Patent: Dec. 18, 2007

(54) CELL ELECTRODE AND ELECTROCHEMICAL CELL THEREWITH

(75) Inventors: Tomoki Nobuta, Miyagi (JP); Toshihiko Nishiyama, Miyagi (JP); Hiroyuki Kamisuki, Miyagi (JP); Shinako Kaneko, Miyagi (JP); Masato Kurosaki, Tokyo (JP); Yuji Nakagawa, Tokyo (JP); Masaya Mitani, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 471 days.

(21) Appl. No.: 10/634,607

(22) Filed: Aug. 5, 2003

(65) Prior Publication Data

US 2004/0029003 A1    Feb. 12, 2004

(30) Foreign Application Priority Data

Aug. 5, 2002    (JP) ............................ 2002-227160

(51) Int. Cl.
    *H01M 4/60*    (2006.01)
(52) U.S. Cl. ...................... 429/213; 429/212; 429/122
(58) Field of Classification Search ................ 429/122, 429/128, 212, 213
    See application file for complete search history.

(56) References Cited

U.S. PATENT DOCUMENTS

| | | | |
|---|---|---|---|
| 4,397,922 A | | 8/1983 | Pokhodenko et al. |
| 6,641,759 B1* | | 11/2003 | Harada et al. ................ 264/85 |
| 6,869,731 B2* | | 3/2005 | Nobuta et al. .............. 429/347 |
| 2002/0073534 A1* | | 6/2002 | Kurosaki et al. .......... 29/623.5 |
| 2003/0044681 A1 | | 3/2003 | Morioka et al. |
| 2003/0077515 A1* | | 4/2003 | Chen et al. ............... 429/231.8 |

FOREIGN PATENT DOCUMENTS

| | | |
|---|---|---|
| EP | 0 911 893 | 4/1999 |
| EP | 0 924 782 | 6/1999 |
| EP | 0 971 426 | 1/2000 |
| JP | 62-226569 | 10/1987 |
| JP | 1-232664 | 9/1989 |
| JP | 3-182051 * | 8/1991 |
| JP | 4-104477 * | 4/1992 |
| JP | 7-320780 | 12/1995 |
| JP | 10-321232 | 12/1998 |
| JP | 2000-156329 | 6/2000 |
| JP | 2001-035494 | 2/2001 |
| JP | 2001-052965 | 2/2001 |
| JP | 2001-118577 | 4/2001 |
| JP | 2001-143748 | 5/2001 |
| JP | 2002-093419 | 3/2002 |
| WO | WO 96/13073 | 5/1996 |
| WO | WO 98/07164 | 2/1998 |

OTHER PUBLICATIONS

Korean Office Action dated Sep. 29, 2005.
European Search Report dated Sep. 7, 2006, for corresponding European Application 03016458.6-2119.

* cited by examiner

*Primary Examiner*—Laura Weiner
(74) *Attorney, Agent, or Firm*—Katten Muchin Rosenman LLP

(57) ABSTRACT

This invention provides an electrode for an electrochemical cell in which an active material in an electrode material is a proton-conducting compound, wherein the electrode material comprises a nitrogen-containing heterocyclic compound or a polymer having a unit containing a nitrogen-containing heterocyclic moiety.

13 Claims, 3 Drawing Sheets

(1): 0.5mol/L (2): 1.5mol/L
(3): 2.0mol/L (4): 3.6mol/L (1): 0.5mol/L (2): 1.5mol/L
(3): 2.0mol/L (4): 3.6mol/L

CELL ELECTRODE AND ELECTROCHEMICAL CELL THEREWITH

BACKGROUND OF THE INVENTION

1. Field of the Invention

This invention relates to an electrode used in an electrochemical cell such as a secondary battery and an electric double-layer capacitor and an electrochemical cell using the electrode. In particular, it relates to an electrode having improved cycle properties without reduction in an appearance capacity, and an electrochemical cell using the electrode.

2. Description of the Related Art

There have been suggested and practically used electrochemical cells (hereinafter, referred to as "cell") such as secondary batteries and electric double-layer capacitors in which a proton-conducting compound is used as an electrode active material. Such a cell is illustrated in a cross-sectional view of FIG. 1.

Specifically, FIG. 1 shows a cell where a positive electrode 2 containing a proton-conducting compound as an active material is formed on a positive current collector 1 while a negative electrode 3 is formed on a negative current collector 4, and these electrodes are combined via a separator 5 and where only protons are involved in an electrode reaction as a charge carrier. Also, the cell is filled with an aqueous or non-aqueous solution containing a proton source as an electrolytic solution, and is sealed by a gasket 6.

The electrodes 2, 3 are formed as follows. A powdery doped or undoped proton-conducting compound is blended with a conductive auxiliary and a binder to prepare a slurry, which is then placed in a mold and molded by a hot press to form an electrode having a desired electrode density and a desired film thickness. Alternatively, the slurry is screen-printed on a conductive base-material and dried to form an electrode. Then, a positive electrode and a negative electrode thus formed are mutually faced via a separator to give a cell.

Examples of a proton-conducting compound used as an electrode active material include π-conjugated polymers such as polyaniline, polythiophene, polypyrrole, polyacetylene, poly-p-phenylene, polyphenylene-vinylene, polyperinaphthalene, polyfuran, polyflurane, polythienylene, polypyridinediyl, polyisothianaphthene, polyquinoxaline, polypyridine, polypyrimidine, polyindole, polyaminoanthraquinone and their derivatives; indole-based compounds such as indole trimer; and hydroxyl-containing polymers such as polyanthraquinone and polybenzoquinone where a quinone oxygen is converted into a hydroxyl group by conjugation). These compounds may be doped to form a redox pair exhibiting conductivity. These compounds are appropriately selected as a positive active material and a negative active material, taking a redox potential difference into account.

Known electrolytic solutions include an aqueous electrolytic solution consisting of an aqueous acid solution and a non-aqueous electrolytic solution based on an organic solvent. When using a proton-conducting compound, the former aqueous electrolytic solution is preferentially used because it can give a high-capacity cell. The acid used may be an organic or inorganic acid; for example, inorganic acids such as sulfuric acid, nitric acid, hydrochloric acid, phosphoric acid, tetrafluoroboric acid, hexafluorophosphoric acid and hexafluorosilicic acid and organic acids such as saturated monocarboxylic acids, aliphatic carboxylic acids, oxycarboxylic acids, p-toluenesulfonic acid, polyvinylsulfonic acid and lauric acid.

A cell using such a proton-conducting compound as an electrode active material has a short cycle life due to increase in an internal resistance, and the tendency becomes more prominent as a temperature is elevated. Furthermore, it has a drawback of insufficient long term stability under a high temperature atmosphere.

These problems are caused by aggravated deterioration atmosphere due to deceleration of proton adsorption-desorption reaction as a charge/discharge mechanism of an electrode active material. In particular, at an elevated temperature, peroxidation of a material is much more accelerated, resulting in accelerated deterioration.

An electrode active material is susceptible to deterioration in an oxidized state. It is probably because a proton ($H^+$) adsorption-desorption reaction for the active material is deteriorated over time in the charge/discharge mechanism as described below. Such deterioration proceeds because doping/dedoping activity of the active material is reduced under an excess proton atmosphere rather than an optimal proton atmosphere which depends on the identity of the active material and the number of reaction electrons, in a proton adsorption-desorption reaction between the active material and an electrolyte. Thus, charge/discharge power of the cell is deteriorated. It is called "peroxidation-perreduction deterioration"; specifically, peroxidation deterioration for an active material of positive electrode and perreduction deterioration for an active material of negative electrode.

This phenomenon will be described for a case where an active material of positive electrode is an indole derivative (indole trimer) while an active material of negative electrode is a quinoxaline polymer. Herein, charge/discharge mechanisms for a positive and a negative electrode materials are as indicated in chemical formulas (8) and (9), respectively, wherein R represent appropriate substituents and $X^-$ represents an anion.

Positive electrode           Negative electrode

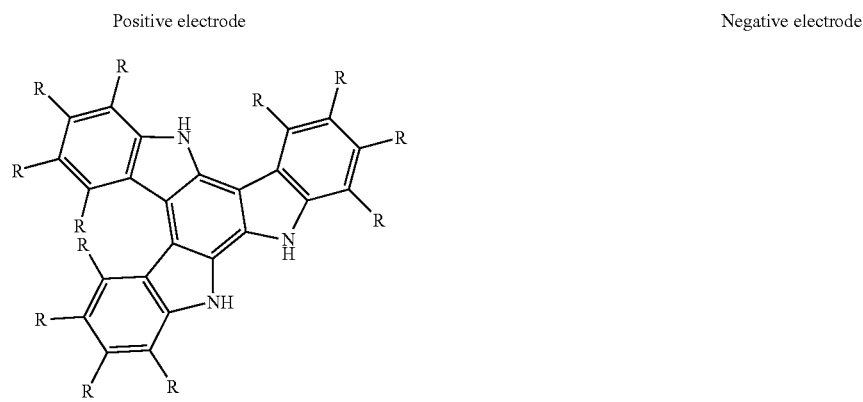

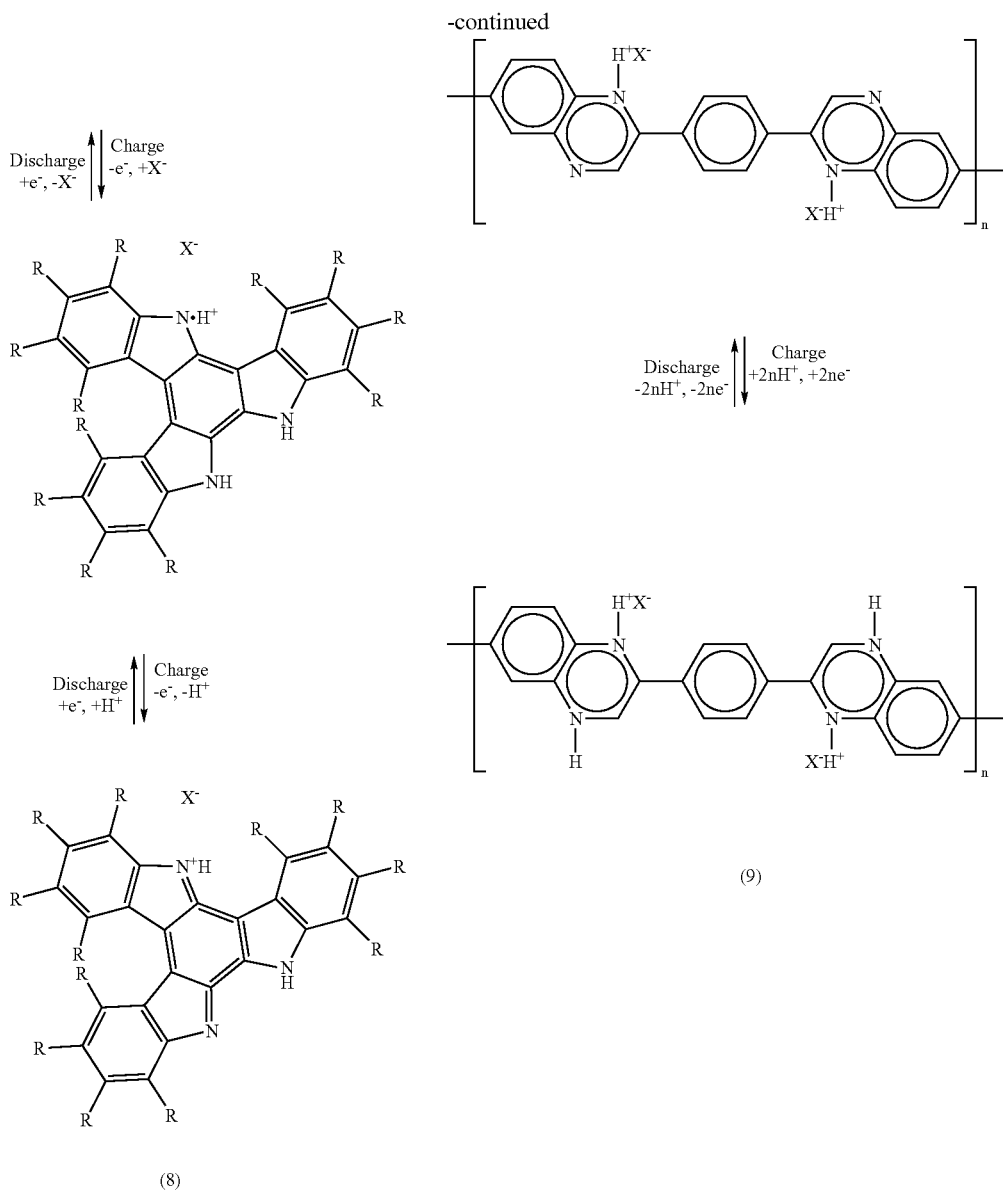

(9)

(8)

Under a high-level acid atmosphere (low pH), the phenomenon particularly tends to occur so that deterioration in cycle properties is accelerated. For polyphenylquinoxaline which can be used as a material of negative electrode, tetraprotonation may be caused whereas a normal doped state is represented by a diprotonated derivative in a charge/discharge mechanism. Thus, the active material is dissolved, leading to reduction in a charge/discharge power. An excessively higher electrolyte concentration (proton concentration) may further accelerate oxidation deterioration.

FIG. 6 is a graph showing variation in cycle properties to an electrolyte concentration (sulfuric acid concentration). As seen in this graph, as an electrolytic solution concentration increases, a capacity decreases according to the cycle number so that cycle properties are deteriorated. In addition, under a low concentration atmosphere, cycle properties are improved while an appearance capacity tends to be reduced. FIG. 7 is a graph illustrating variation in an appearance capacity to an electrolyte concentration (sulfuric acid concentration). As seen in this graph, as an electrolyte concentration is reduced, an appearance capacity is reduced.

Electrolytic solutions comprising a nitrogen-containing heterocyclic compound as a non-aqueous electrolytic solution in the prior art have been described in Japanese Laid-open Patent Publication Nos. 2000-156329 (Prior art 1) and 2001-143748 (Prior art 2). Japanese Laid-open Patent Publication No. 7-320780 (Prior art 3) has described a solid-electrolyte secondary battery comprising a polymer gel electrolyte consisting of, for example, an aprotic solvent and polyimidazole. Japanese Laid-open Patent Publication No. 10-321232 (Prior art 4) has described an electrode comprising a benzimidazole derivative although an electrolytic solution used therein is different from that in this invention.

In Prior art 1, there has been disclosed an electrolytic solution for an aluminum electrolysis capacitor comprising a quaternary salt having of a quaternary cation from a compound containing N,N,N'-substituted amidine group and an organic acid anion, and an organic solvent. There has been described that although a conventional electrolytic solution comprising a quaternary ammonium carboxylate has a drawback that degradation of a rubber packing is accelerated so that sealing performance is significantly deteriorated, an additive having a cationic, quaternary amidine group may improve thermal stability of the electrolytic solution and a specific conductivity, and that in particular, a compound in which electrons in the amidine group are delocalized and a cation is stabilized by resonance gives an improved specific conductivity because of accelerated ion dissociation. There has been further described that when excess hydroxide ions are generated after electrolysis in the electrolytic solution, the hydroxide ions may rapidly disappear by reaction of the hydroxide ions and the amidine group so that unlike a conventional quaternary ammonium salt, effects of the electrolysis can be reduced and thus degradation of a packing in a capacitor can be minimized, resulting in improved sealing performance.

Prior art 2 has disclosed an electrolytic solution for a non-aqueous electrolyte lithium secondary battery, comprising a lithium salt of a perfluoroalkylsulfonic acid dissolved in an organic solvent and at least one selected from heterocyclic compounds containing at least one fluorine atom and a nitrogen or oxygen atom. According to Prior art 2, the heterocyclic compound added to the electrolytic solution can form a strongly adsorptive and antioxidative film on a positive current collector, resulting in preventing oxidation deterioration of the positive current collector and thus improvement in cycle properties.

Prior art 3 has disclosed a solid electrolyte secondary battery comprising a positive electrode, a negative electrode containing lithium as an active material, and a polymer solid electrolyte consisting of a complex of an electrolyte salt with a polymer or a polymer gel electrolyte prepared by impregnating an electrolytic solution of an electrolyte salt dissolved in an aprotic solvent into a polymer, wherein the polymer is selected from the group consisting of a polyamide, polyimidazole, a polyimide, polyoxazole, polytetrafluoroethylene, polymelamineformamide, a polycarbonate and polypropylene. There is described that cycle properties are improved because the electrolyte is unreactive to the negative electrode and thus an internal resistance is unlikely to be increased even after repeating charge/discharge cycles.

For solving the problems of a reduced appearance capacity and deteriorated cycle properties seen in FIGS. 6 and 7, it is necessary to provide an optimal electrolyte composition ($H^+$, $X^-$), or to improve an electrode for preventing peroxidation-perreduction deterioration of an electrode active material in the reaction between an electrolyte and the active material.

In both Prior arts 1 and 2, a nitrogen-containing heterocyclic compound is added to a non-aqueous electrolytic solution. In Prior art 3, a polymer gel electrolyte consisting of, for example, an aprotic solvent and a polyimidazole is used to make the electrolyte unreactive to lithium in the negative electrode so that increase of an internal resistance can be minimized and thus cycle properties can be improved. In any of Prior arts 1, 2 and 3, a nitrogen-containing heterocyclic compound or its polymer is added to an electrolyte, which is different from this invention where a particular substance is added and blended in an electrode.

Since Prior art 4 relates to a lithium battery in which an electrolytic solution contains an organic solvent, a proton concentration is not taken into consideration. Thus, a mechanism of proton conductivity or deterioration as characteristics of an active material is considerably different. Prior art 4 is different from this invention in which an electrolytic solution contains a proton source and a proton-conducting compound is used as an active material.

SUMMARY OF THE INVENTION

An objective of this invention is to improve an electrode for preventing peroxidation-perreduction deterioration of an electrode active material and to provide a cell electrode exhibiting improved cycle properties and an electrochemical cell comprising the electrode.

This invention provides an electrode for an electrochemical cell in which an active material in an electrode material is a proton-conducting compound, wherein the electrode material comprises a nitrogen-containing heterocyclic compound or a polymer having a unit containing a nitrogen-containing heterocyclic moiety.

This cell electrode may be suitably used in an electrochemical cell in which only protons act as a charge carrier in a redox reaction in both electrodes associated with charge and discharge.

This invention also provides an electrochemical cell wherein the above cell electrode according to this invention is used for at least one of the electrodes and both electrodes comprise a proton-conducting compound as an active material.

This invention also relates to the above electrochemical cell wherein only protons can act as a charge carrier in a redox reaction in both electrodes associated with charge and discharge. More specifically, this invention relates to the electrochemical cell comprising an electrolyte containing a proton source wherein only adsorption and desorption of protons in the electrode active material can be involved in electron transfer in a redox reaction in both electrodes associated with charge and discharge.

In this invention, the nitrogen-containing heterocyclic compound may be one or more selected from the group consisting of imidazole, triazole, pyrazole, benzimidazole and their derivatives.

The above polymer having a unit containing a nitrogen-containing heterocyclic moiety may be a polymer having a unit containing a benzimidazole, benzbisimidazole or imidazole moiety.

This invention can improve cycle properties while inhibiting reduction in an appearance capacity. This is because a nitrogen-containing heterocyclic compound or polymer having a unit containing a nitrogen-containing heterocyclic moiety added to an electrode interacts with protons in an electrolyte so that only a proton concentration can be controlled without reducing a concentration of anions acting as dopant in an adsorption-desorption reaction between the active material and protons in the electrolyte. It is also because an optimal proton-concentration atmosphere for the reaction can be created, resulting in inhibition of deterioration due to peroxidation.

The polymer in this invention implies the compound having two or more recurring unit, or includes so-called oligomers.

DETAILED DESCRIPTION OF THE INVENTION

Preferred embodiments of this invention will be detailed.

A cell electrode according to this invention is made of an electrode material comprising a proton-conducting compound as an active material and a nitrogen-containing heterocyclic compound or a polymer having a unit containing a nitrogen-containing heterocyclic moiety. Another cell electrode according to this invention is made of an electrode material comprising, as an active material, a polymer having a unit constituting a proton-conducting polymer and a unit having a nitrogen-containing heterocyclic moiety (the both units may constitute one unit).

An electrochemical cell according to this invention employs the above electrode according to this invention as at least one electrode and otherwise may be as with a conventional cell. An electrochemical cell according to this invention is preferably that wherein only protons act as a charge carrier in a redox reaction associated with charge and discharge in both electrodes; more specifically that comprising an electrolyte containing a proton source wherein only adsorption and desorption of protons in the electrode active material can be involved in electron transfer in a redox reaction in both electrodes associated with charge and discharge.

Figure 1:
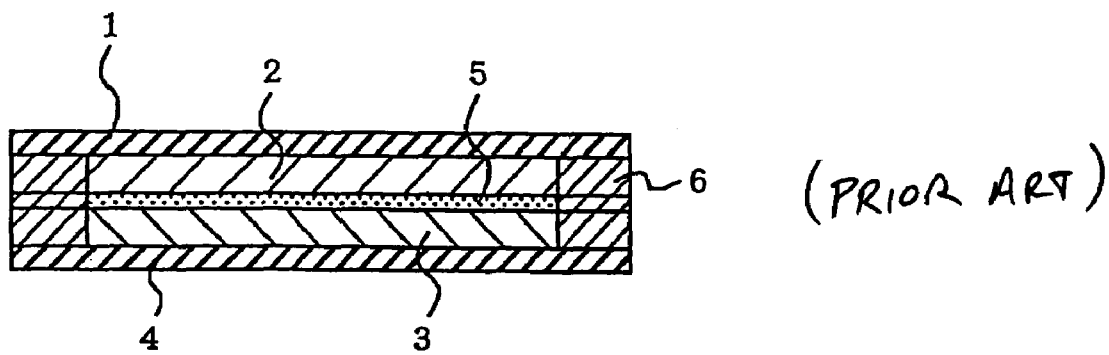
FIG. 1 is a cross section of an electrochemical cell according to an embodiment of this invention.

An electrochemical cell may have a basic configuration as shown in, for example, FIG. 1, where a positive electrode 2 comprising a proton-conducting compound as an active material and a negative electrode 3 are formed on a positive current collector 1 and a negative current collector 4, respectively, and these electrodes are laminated via a separator 5. The cell is filled with an aqueous or non-aqueous solution containing a proton source as an electrolytic solution and is sealed by a gasket 6.

The electrodes 2, 3 can be, for example, formed as follows. A powdery doped or undoped proton-conducting compound is blended with a conductive auxiliary, a binder and a nitrogen-containing heterocyclic compound or a polymer having a unit containing a nitrogen-containing heterocyclic moiety to prepare a slurry, which is then placed in a mold with a desired size and molded by a hot press to form an electrode having a desired electrode density and a desired film thickness. Then, a positive electrode and a negative electrode thus formed are mutually faced via a separator to give a cell.

A nitrogen-containing heterocyclic compound used in this invention may be preferably one or more selected from the group consisting of imidazole, triazole, pyrazole, benzimidazole and their derivatives. Specifically, the nitrogen-containing heterocyclic compound represented by chemical formulas (1) to (5) may be used.

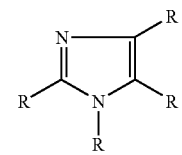

(1)

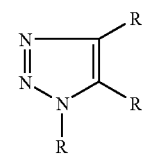

(2)

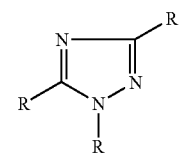

(3)

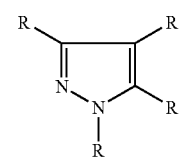

(4)

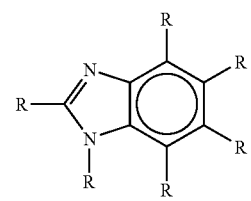

(5)

wherein R independently represent hydrogen, alkyl having 1 to 4 carbon atoms, amino, carboxyl, nitro, phenyl, vinyl, halogen, acyl, cyano, trifluoromethyl, alkylsulfonyl and trifluoromethylthio.

Examples of a halogen atom include fluorine, chlorine, bromine and iodine. Examples of an alkyl group having 1 to 4 carbon atoms include methyl, ethyl, propyl, isopropyl, n-butyl, s-butyl, isobutyl and t-butyl. An acyl group may be selected from those having an alkyl having 1 to 4 carbon atoms as described above. An alkylsulfonyl group may be selected from those having an alkyl having 1 to 4 carbon atoms as described above.

A polymer having a unit containing a nitrogen-containing heterocyclic moiety may be a polymer having a unit containing a benzimidazole, benzbisimidazole or imidazole moiety; for example, a nitrogen-containing basic polymer such as a benzimidazole-based polymer represented by chemical formula (6) or (10) and a polyvinylimidazole represented by chemical formula (7), polybenzbisimidazole, benzbisimidazole-based polymer represented by chemical formula (11) or polyimidazole represented by chemical formula (12).

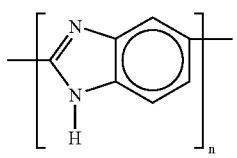

(6)

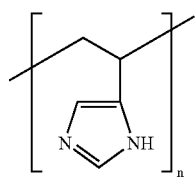

(7)

wherein n represents a positive integer, and H bonded to N may be independently replaced with a substituent selected from the above-described R.

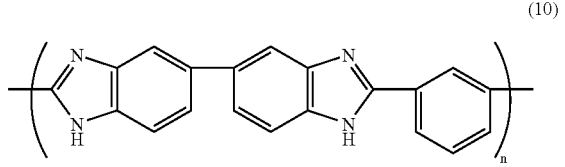

(10)

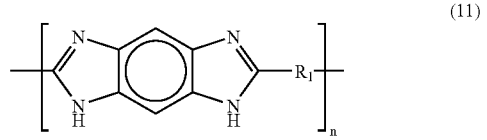

(11)

(12)

wherein n represents a positive integer, H bonded to N may be independently replaced with a substituent selected from the above-described R, and R1 represents a divalent group such as an alkylene having 1 to 4 carbon atoms and a substituted or non-substituted phenylene.

Using such an electrode, a reaction described below may occur with ions in an electrolytic solution containing a proton source. When the nitrogen-containing heterocyclic compound is imidazole, imidazole adsorbs a proton as shown in chemical formula (13).

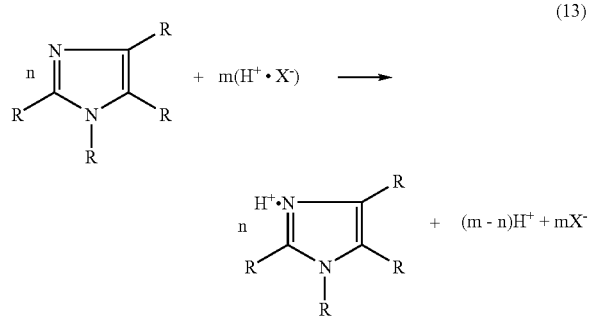

(13)

wherein n represents a positive integer and m represents an integer larger than n.

Such proton adsorption by imidazole results in prevention of peroxidation or perreduction of an active material of positive and thus a longer cycle life of the cell. As described above, a concentration of protons involved in a reaction with an active material may be appropriately adjusted by controlling the amount of a nitrogen-containing heterocyclic compound or polymer having a unit containing a nitrogen-containing heterocyclic moiety to be added and blended, without varying a concentration of an anion to be a dopant. Thus, a higher appearance capacity of the cell can be maintained and cycle properties can be improved.

A polymer having a unit containing a nitrogen-containing heterocyclic moiety may be a polymer having a unit constituting a conventional proton-conducting polymer and a unit of a nitrogen-containing heterocyclic compound or of a monomer compound having a nitrogen-containing heterocyclic moiety. The polymer acts as a proton-conducting active material as well as an inhibitor of peroxidation-perreduction deterioration for the above nitrogen-containing heterocyclic compound. An electrode comprising the polymer as an electrode active material can, therefore, exhibit improvement equivalent to that achieved by an electrode comprising the above nitrogen-containing heterocyclic compound or the polymer having a unit containing a nitrogen-containing heterocyclic moiety. In other words, there may be provided a cell where peroxidation-perreduction deterioration is much more reduced in comparison with a conventional electrode as described later even under a high proton concentration atmosphere.

In the light of inhibition of peroxidation-perreduction deterioration, a copolymerization composition for a polymer having a unit containing a nitrogen-containing heterocyclic moiety according to this invention may be such that a unit containing a nitrogen-containing heterocyclic moiety is preferably at least 5 mol %, more preferably at least 10 mol %. On the other hand, in the light of its function as an active material such as a capacity appearance rate, the unit may be contained in an amount of preferably 90 mol % or less, more preferably 80 mol % or less. The polymer having the weight-average molecular weight of 1000 to 50000, preferably 3000 to 15000 measured with GPC may be used in this invention.

Figure 2:
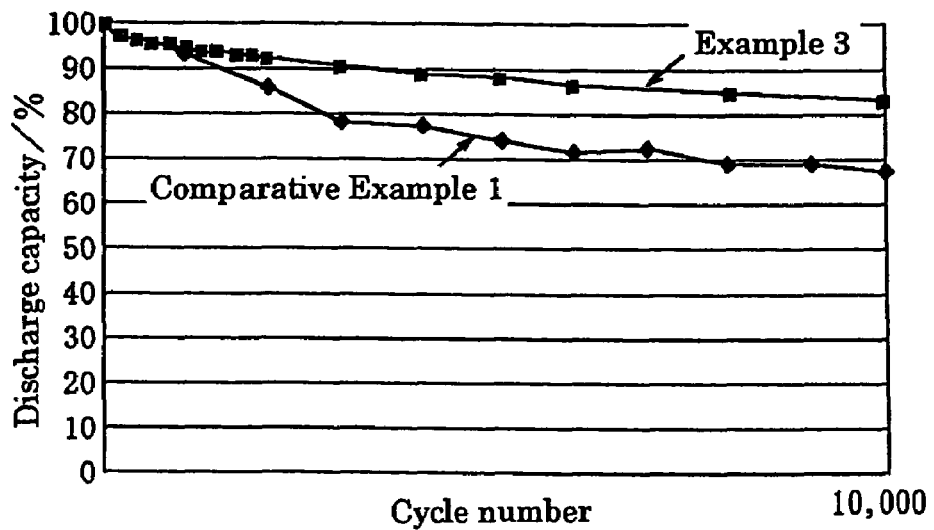
FIG. 2 is a graph showing CV measurement results for a positive electrode in an aqueous sulfuric acid solution using electrodes according to this invention and according to the prior art.

For determining the effects of this invention, a positive electrode (comprising an indole trimer as an active material) was evaluated by cyclic voltammetry (CV-measurement). In this measurement, a working electrode was an electrode formed by depositing a mixture of an active material of positive electrode with imidazole on a carbon sheet; a counter electrode was a platinum electrode; and a reference electrode was an Ag/AgCl electrode. A measuring temperature was 25° C., a scan voltage ranged from 600 to 1100 mV, and a scan speed was 1 mV/sec. An electrolytic solution was a 20 wt % aqueous solution of sulfuric acid, and a composition of a positive electrode material as the working electrode was that described in Example 3 (containing 20 wt % of imidazole). An electrode without imidazole (Comparative Example 1 described later) was also evaluated as a reference example. The results are shown in a graph in FIG. 2.

The results show that reduction in a discharge capacity in Example 3 is less than that in Comparative Example 1. In relation to Comparative Example 1, a redox potential in Example 3 was shifted to lower potential side by several tens of mV. That is, shift to a stable potential at which oxidation deterioration is reduced was observed. It may be concluded that a cycle life was prolonged.

Figure 3:
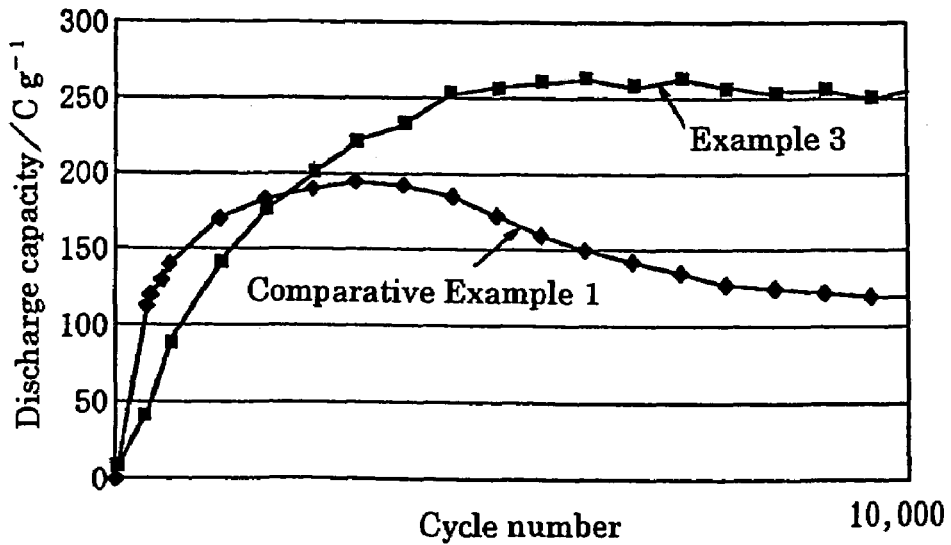
FIG. 3 is a graph showing CV measurement results for a negative electrode in an aqueous sulfuric acid solution using electrodes according to this invention and according to the prior art.

An active material of negative electrode (polyphenylquinoxaline) was also evaluated by CV measurement using the negative electrodes described in Example 3 and Comparative Example 1. FIG. 3 shows the results of variation in their discharge capacity. The results show that deterioration in a capacity due to excessive protonation of the active material of negative electrode was inhibited.

It was, therefore, shown that this invention can prevent deterioration in both electrodes, a positive electrode and a negative electrode.

In the above examples, an aqueous electrolytic solution has been described. However, in this invention, an electrolyte may be any electrolyte containing a proton source, and reduction in a capacity may be similarly inhibited for a different type of electrolyte such as a non-aqueous electrolytic solution, a gel electrolyte and a solid electrolyte. In both cases using a cell electrode comprising the above nitrogen-containing heterocyclic compound and using a cell electrode comprising the polymer having a unit containing a nitrogen-containing heterocyclic moiety, inhibition in capacity reduction (inhibition of active material deterioration) can be obtained.

An electrode active material constituting a cell electrode of this invention exhibits conductivity by being doped to form a redox pair, and thus may be a proton-conducting compound known in the art. A proton-conducting compound means a compound which can generate an electrochemical reaction involving only adsorption and desorption of protons in electron transfer associated with a redox reaction. Examples of such a compound include π-conjugated polymers such as polyaniline polymers (e.g., polyaniline), polythiophene, polypyrrole, polyacetylene, poly-p-phenylene, polyphenylene-vinylene, polyperinaphthalene, polyfuran, polyflurane, polythienylene, polypyridinediyl, polyisothianaphthene, polyquinoxaline, polypyridine, polypyrimidine, polyindole, polyaminoanthraquinone and their derivatives; indole-based compounds such as indole trimer and its derivative; and hydroxyl-containing polymers such as polyanthraquinone and polybenzoquinone where a quinone oxygen is converted into a hydroxyl group by conjugation. These compounds are appropriately selected as an active material of positive electrode or negative electrode, taking a redox potential difference into account.

Among these, an active material of positive electrode is preferably selected from the group consisting of polyaniline, polydianiline, polydiaminoanthraquinone, polybiphenylaniline, polynaphthylaniline, polyindole and indole-based compounds. An active material of negative electrode is preferably selected from the group consisting of polypyridine, polypyrimidine, polyquinoxaline and their derivatives. In particular, preferred is a combination of an indole-based compound as an active material of positive electrode and a quinoxaline-based polymer as an active material of negative electrode. The indole-based compound is preferably one or more of an indole trimer and its derivatives (an indole trimer compound) while the quinoxaline-based polymer is preferably polyphenylquinoxaline.

An indole trimer compound has a fused polycyclic structure comprising a six-membered ring formed by atoms at the second and the third positions in three indole rings. The indole trimer compound can be prepared from one or more compounds selected from indole or indole derivatives or alternatively indoline or its derivatives, by a known electrochemical or chemical process.

Examples of such indole trimer compound include those represented by the following chemical formulas:

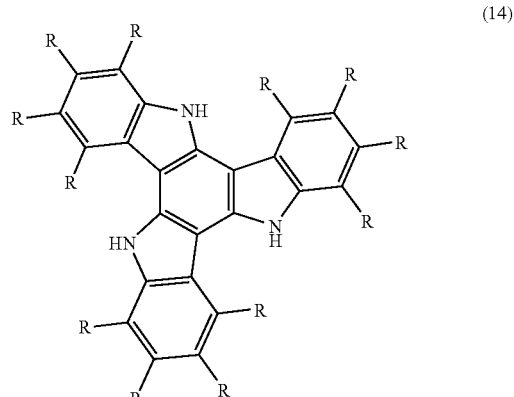

(14)

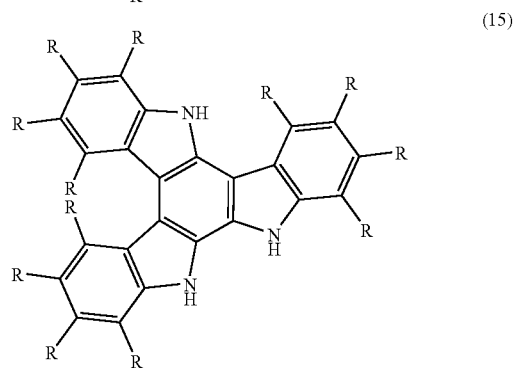

(15)

wherein R independently represent hydrogen, halogen, hydroxyl, carboxyl, sulfone, sulfate, nitro, cyano, alkyl, aryl, alkoxyl, amino, alkylthio or arylthio.

In these formulas, examples of halogen in R include fluorine, chlorine, bromine and iodine. Examples of alkyl in R in these formulas include methyl, ethyl, propyl, isopropyl, n-butyl, s-butyl, isobutyl, t-butyl, n-pentyl, n-hexyl, n-heptyl and n-octyl. Alkoxy in R in these formulas is a substituent represented by —OX, wherein X may be alkyl as described above. Examples of aryl in R in these formulas include phenyl, naphthyl and anthryl. The alkyl moiety in alkylthio in R in these formulas may be selected from those described above. The aryl moiety in arylthio in R in these formulas may be selected from those described above.

A quinoxaline-based polymer is a polymer having a unit containing a quinoxaline moiety which may be represented by any of the following formulas (16) and (17). A preferable quinoxaline-based polymer is a polymer having a unit containing 2,2-(p-phenylene)diquinoxaline moiety represented by the formula (17).

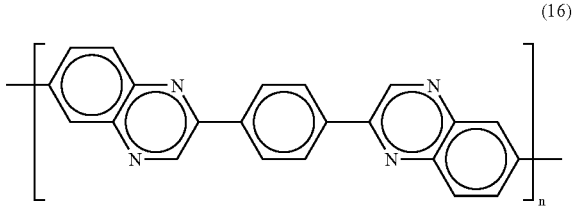

(16)

-continued

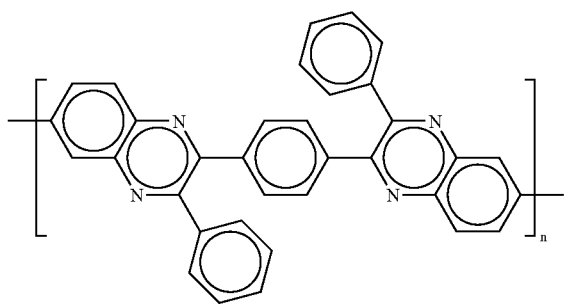

(17)

wherein n represents a positive integer.

An electrolyte in this invention may be any electrolyte containing a proton source, preferably an electrolytic solution containing a proton source, particularly an aqueous solution of sulfuric acid. A proton source may be an inorganic or organic acid. Examples of an inorganic acid include sulfuric acid, nitric acid, hydrochloric acid, phosphoric acid, tetrafluoroboric acid, hexafluorophosphoric acid and hexafluorosilicic acid. Examples of an organic acid include saturated monocarboxylic acids, aliphatic carboxylic acids, oxycarboxylic acids, p-toluenesulfonic acid, polyvinylsulfonic acid and lauric acid.

A proton concentration in an electrolytic solution containing a proton source is preferably $10^{-3}$ mol/L or more, more preferably $10^{-1}$ mol/L or more in the light of reactivity of the electrode materials while being preferably 18 mol/L or less, more preferably 7 mol/L or less in the light of deterioration in activity of the electrode materials and prevention of dissolution.

A content of a nitrogen-containing heterocyclic compound or a polymer having a unit containing a nitrogen-containing heterocyclic moiety in a cell electrode may be appropriately selected depending on the type of the compound or polymer and the type and a concentration of the electrolyte. If it is too low, oxidation deterioration of an active material may be inadequately inhibited. If the content is too high, an appearance capacity may be reduced, leading to deterioration in other properties. The content is, therefore, preferably 1 to 80 parts by weight to 100 parts by weight of the active material.

EXAMPLES

This invention will be described with reference to, but not limited to, examples, and variations may be acceptable in this invention without departing from the gist of this invention. There will be described examples of application to a secondary battery, but this invention may be suitably applied to another electrochemical cell such as an electric double layer capacitor by properly adjusting parameters such as a capacity and a charge/discharge rate.

Example 1

A positive electrode used was prepared as follows. To indole trimer 69 wt % as an active material were added 23 wt % of vapor growth carbon (VGCF) as a conductive auxiliary and 8 wt % of a polyfluorovinylidene (average molecular weight: 1100) as an electrode molding component. To 100 wt % of the mixture was added 5 wt % of imidazole. The resultant mixture was stirred and blended in a blender and then molded by a hot press into a solid electrode having a desired size, which was used as a positive electrode 2.

A negative electrode used was prepared as follows. To polyphenylquinoxaline 75 wt % as an active material were added 25 wt % of carbon black (K.B.600) as a conductive auxiliary. To 100 wt % of the mixture was then added 5 wt % of imidazole. The resultant mixture was stirred and blended in a blender and then molded by a hot press into a solid electrode having a desired size, which was used as a negative electrode 3.

An electrolytic solution used was a 20 wt % aqueous solution of sulfuric acid.

A separator 5 used was a cation-exchange membrane with a thickness of 10 to 50 μm.

The positive electrode and the negative electrode were laminated together via a separator such that their electrode surfaces mutually faced, and a gasket was mounted to form a battery as shown in FIG. 1.

Example 2

A positive electrode was prepared as described in Example 1 without adding imidazole. A negative electrode was prepared as described in Example 1 except adding 20 wt % of imidazole. A battery was formed as described in Example 1, except these electrodes were used.

Example 3

A positive electrode was prepared as described in Example 1 except adding 20 wt % of imidazole. A negative electrode was prepared as described in Example 1 except adding 20 wt % of imidazole. A battery was formed as described in Example 1, except these electrodes were used.

Example 4

A positive electrode was prepared as described in Example 1 except adding 50 wt % of imidazole. A negative electrode was prepared as described in Example 1 except adding 50 wt % of imidazole. A battery was formed as described in Example 1, except these electrodes were used.

Example 5

A positive electrode was prepared as described in Example 1 except adding 20 wt % of imidazole. A negative electrode was prepared as described in Example 1 except adding 20 wt % of 1,2,4-triazole. A battery was formed as described in Example 1, except these electrodes were used.

Example 6

A positive electrode was prepared as described in Example 1 except adding 20 wt % of 2-phenylimidazole instead of the imidazole. A negative electrode was prepared as described in Example 1 except adding 20 wt % of 2-phenylimidazole. A battery was formed as described in Example 1, except these electrodes were used.

Example 7

A positive electrode was prepared as described in Example 1 except adding 20 wt % of 3-trifluoromethylbenzimidazole instead of the imidazole. A negative electrode was prepared as described in Example 1 except adding 20 wt % of 3-trifluoromethylbenzimidazole instead of the imidazole. A battery was formed as described in Example 1, except these electrodes were used.

Example 8

A positive electrode was prepared as described in Example 1 except adding 20 wt % of imidazole. A negative electrode was prepared as described in Example 1 except adding 20 wt % of 3-trifluoromethylbenzimidazole instead of the imidazole. A battery was formed as described in Example 1, except these electrodes were used.

Example 9

A positive electrode was prepared as described in Example 1 except adding 10 wt % of imidazole and 10 wt % of 1,2,4-triazole. A negative electrode was prepared as described in Example 1 except adding 20 wt % of 1,2,4-triazole instead of the imidazole. A battery was formed as described in Example 1, except these electrodes were used.

Example 10

A positive electrode was prepared as described in Example 1 except adding 10 wt % of imidazole and 10 wt % of 3-trifluoromethylbenzimidazole. A negative electrode was prepared as described in Example 1 except adding 10 wt % of 1,2,4-triazole and 10 wt % of 3-trifluoromethylpyrazole instead of the imidazole. A battery was formed as described in Example 1, except these electrodes were used.

Example 11

A positive electrode was prepared as described in Example 1 except adding 60 wt % of imidazole. A negative electrode was prepared as described in Example 1 except adding 60 wt % of imidazole. An electrolytic solution used was a 30 wt % aqueous solution of sulfuric acid. A battery was formed as described in Example 1, except these electrodes and the electrolytic solution were used.

Example 12

A positive electrode was prepared as described in Example 1 without adding imidazole. A negative electrode was prepared as described in Example 1 except adding 5 wt % of polybenzimidazole instead of the imidazole. A battery was formed as described in Example 1, except these electrodes were used.

Example 13

A positive electrode was prepared as described in Example 1 except adding 5 wt % of polybenzimidazole instead of the imidazole. A negative electrode was prepared as described in Example 1 except adding 5 wt % of polybenzimidazole instead of the imidazole. A battery was formed as described in Example 1, except these electrodes were used.

Example 14

A positive electrode was prepared as described in Example 1 adding 20 wt % of polybenzimidazole instead of the imidazole. A negative electrode was prepared as described in Example 1 adding 20 wt % of polybenzimidazole instead of the imidazole. A battery was formed as described in Example 1, except these electrodes were used.

Example 15

A positive electrode was prepared as described in Example 1 except adding 20 wt % of polyvinylimidazole instead of the imidazole. A negative electrode was prepared as described in Example 1 except adding 20 wt % of polyvinylimidazole instead of the imidazole. A battery was formed as described in Example 1, except these electrodes were used.

Example 16

A positive electrode was prepared as described in Example 1 except adding 10 wt % of polybenzimidazole and 10 wt % of polyvinylimidazole instead of the imidazole. A negative electrode was prepared as described in Example 1 except adding 20 wt % of polyvinylimidazole instead of the imidazole. A battery was formed as described in Example 1, except these electrodes were used.

Example 17

A positive electrode was prepared as described in Example 1 except adding 20 wt % of imidazole. A negative electrode was prepared as described in Example 1 except adding 10 wt % of polybenzimidazole and 10 wt % of polyvinylimidazole instead of the imidazole. A battery was formed as described in Example 1, except these electrodes were used.

Example 18

A positive electrode was prepared as described in Example 1 except adding 20 wt % of 3-trifluoromethylpyrazole instead of the imidazole. A negative electrode was prepared as described in Example 1 except adding 10 wt % of polybenzimidazole and 10 wt % of polyvinylimidazole instead of the imidazole. A battery was formed as described in Example 1, except these electrodes were used.

Example 19

A positive electrode was prepared as described in Example 1 without adding imidazole. As an active material of a negative electrode, a proton-conducting polymer (Mw: 10000) having the unit represented by the formula (18) was prepared by condensation polymerization of 3,3-diaminobenzidine (DABZ) and 1,4-bisbenzil (BBZ) in the presence of terephthalaldehyde using a platinum catalyst in DMF solvent. A negative electrode comprising the polymer having the units containing the phenylginoxaline moiety and the benzimidazole moiety (75 wt %) and a conductive auxiliary (25 wt %) was prepared. A battery was formed as described in Example 1, except these electrodes were used.

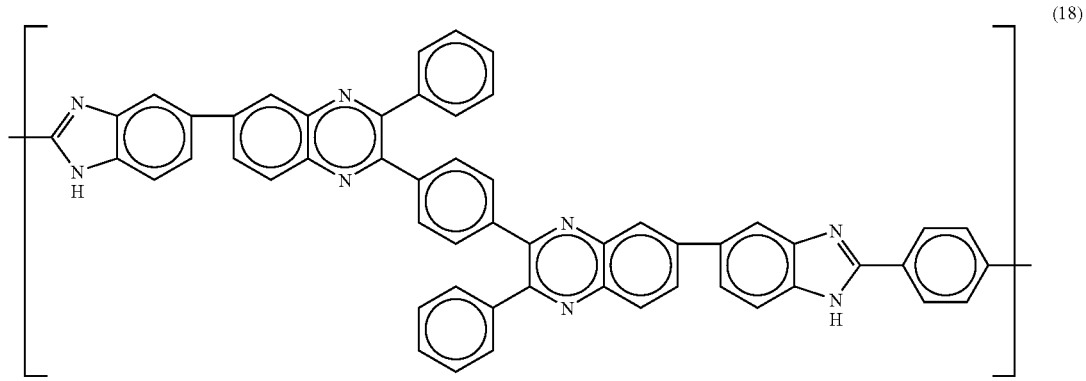

(18)

Example 20

A positive electrode was prepared as described in Example 1 except adding 1,2,4-triazole. A negative electrode was prepared as described in Example 19. A battery was formed as described in Example 1, except these electrodes were used.

Example 21

A positive electrode was prepared as described in Example 1 except adding 1,2,4-triazole instead of the imidazole. A negative electrode was prepared as described in Example 1 except adding 10 wt % (to the content of polyphenylquinoxaline) of a proton-conducting polymer having a unit containing a nitrogen-containing heterocyclic moiety as described in Example 19 instead of the imidazole. A battery was formed as described in Example 1, except these electrodes were used.

Example 22

A positive electrode was prepared as described in Example 1 without adding imidazole. A negative electrode was prepared as described in Example 1 except adding 10 wt % (to the content of polyphenylquinoxaline) of a proton-conducting polymer having a unit containing a nitrogen-containing heterocyclic moiety as described in Example 19 instead of the imidazole. A battery was formed as described in Example 1, except these electrodes were used.

Example 23

A positive electrode was prepared as described in Example 1 without adding imidazole. A negative electrode was prepared as described in Example 1 except adding 10 wt % (to the content of polyphenylquinoxaline) of a proton-conducting polymer having a unit containing a nitrogen-containing heterocyclic moiety as described in Example 19 and 10 wt % (to the content of polyphenylquinoxaline) of polybenzimidazole instead of the imidazole. A battery was formed as described in Example 1, except these electrodes were used.

Example 24

A positive electrode was prepared as described in Example 1 without adding imidazole. A negative electrode was prepared as described in Example 1 except adding 50 wt % (to the content of polyphenylquinoxaline) of a proton-conducting polymer having a unit containing a nitrogen-containing heterocyclic moiety as described in Example 19 and 10 wt % (to the content of polyphenylquinoxaline) of polybenzimidazole instead of the imidazole. A battery was formed as described in Example 1, except these electrodes were used.

Comparative Example 1

Electrodes were prepared as described in Example 1 without adding imidazole in either electrode. A battery was formed as described in Example 1, except these electrodes were used.

Comparative Example 2

Electrodes were prepared as described in Example 1 without adding imidazole in either electrode. An electrolytic solution used was a 30 wt % aqueous solution of sulfuric acid. A battery was formed as described in Example 1, except these electrodes and the electrolytic solution were used.

The batteries prepared in Examples 1 to 24 and Comparative Examples 1 and 2 were evaluated for an appearance capacity and cycle properties. The results are shown in Table 1.

TABLE 1

|  | Appearance capacity (%) | Cycle properties (%) | Cell internal resistance variation ratio (%) |
| --- | --- | --- | --- |
| Exam. 1 | 98.4 | 83.4 | 118 |
| Exam. 2 | 99.9 | 82.6 | 119 |
| Exam. 3 | 97.2 | 88.3 | 111 |
| Exam. 4 | 85.8 | 90.5 | 107 |
| Exam. 5 | 100.1 | 84.6 | 115 |
| Exam. 6 | 99.9 | 85.7 | 115 |
| Exam. 7 | 100.1 | 86.8 | 115 |
| Exam. 8 | 97.8 | 82.1 | 119 |
| Exam. 9 | 102.3 | 86.7 | 115 |
| Exam. 10 | 99.4 | 85.2 | 115 |
| Exam. 11 | 99.9 | 82.9 | 119 |
| Exam. 12 | 100.9 | 85.6 | 114 |
| Exam. 13 | 102.1 | 88.8 | 111 |
| Exam. 14 | 101.5 | 93.4 | 106 |
| Exam. 15 | 100.6 | 93.2 | 106 |

TABLE 1-continued

|  | Appearance capacity (%) | Cycle properties (%) | Cell internal resistance variation ratio (%) |
|---|---|---|---|
| Exam. 16 | 100.1 | 90.8 | 109 |
| Exam. 17 | 100.1 | 86.7 | 112 |
| Exam. 18 | 99.8 | 86.4 | 113 |
| Exam. 19 | 104.2 | 94.9 | 105 |
| Exam. 20 | 102.8 | 96.4 | 104 |
| Exam. 21 | 101.3 | 95.2 | 102 |
| Exam. 22 | 102.1 | 92.6 | 105 |
| Exam. 23 | 100.5 | 91.9 | 107 |
| Exam. 24 | 101.9 | 94.1 | 105 |
| Comp.Ex. 1 | 100.0 | 80.1 | 121 |
| Comp.Ex. 2 | 102.6 | 65.0 | 138 |

In Table 1, an appearance capacity is a relative value (%) calculated to an appearance capacity in Comparative Example 1 (100%). Cycle properties is expressed as a relative discharge capacity (%) (measured at 25° C.) to a discharge capacity at the initiation of the cycles. Cell internal resistance variation ratio is a relative value (%) of a direct-current resistance after 10,000 cycles to a direct-current resistance at the initiation of the cycles. Cycle conditions were as follows; charging: CCCV discharge at 1A and 1.2 V for 10 min, discharging: CC discharge at 0.2 A (equivalent to 1C), and final voltage: 0.8 V.

Figure 4:
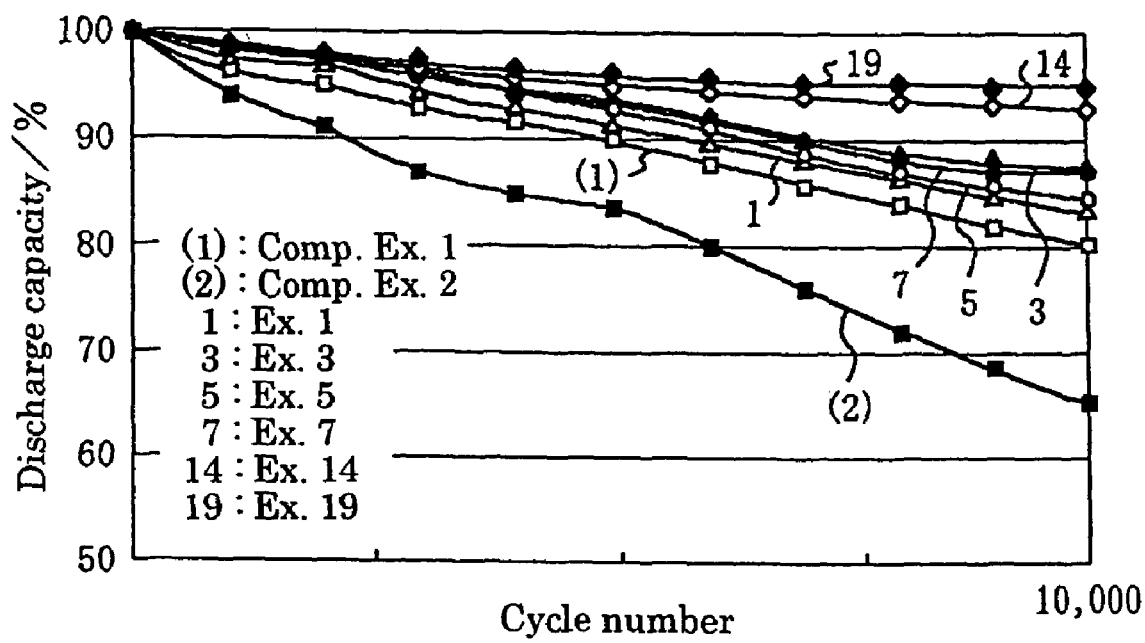
FIG. 4 is a graph showing variation in cycle properties for batteries according to this invention (Examples 1, 3, 5, 7, 14 and 19 and according to the prior art (Comparative Examples 1 and 2).
Figure 5:
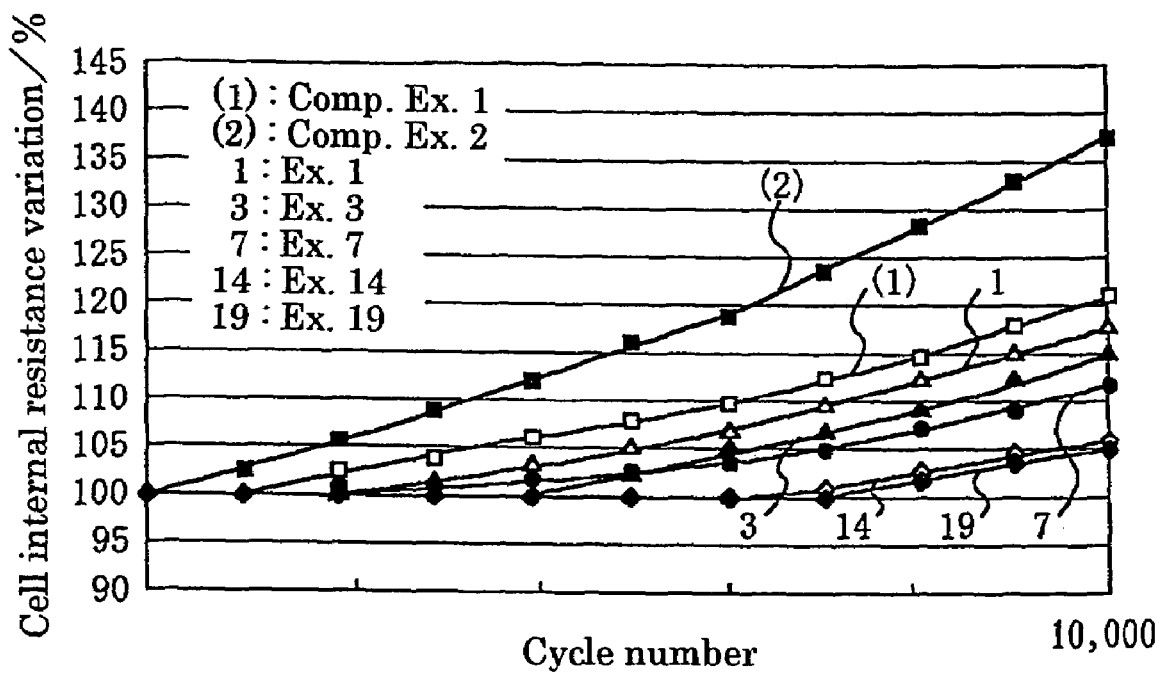
FIG. 5 is a graph showing variation in a cell internal resistance vs the cycle number for batteries according to this invention (Examples 1, 3, 7, 14 and 19) and according to the prior art (Comparative Examples 1 and 2).
Figure 6:
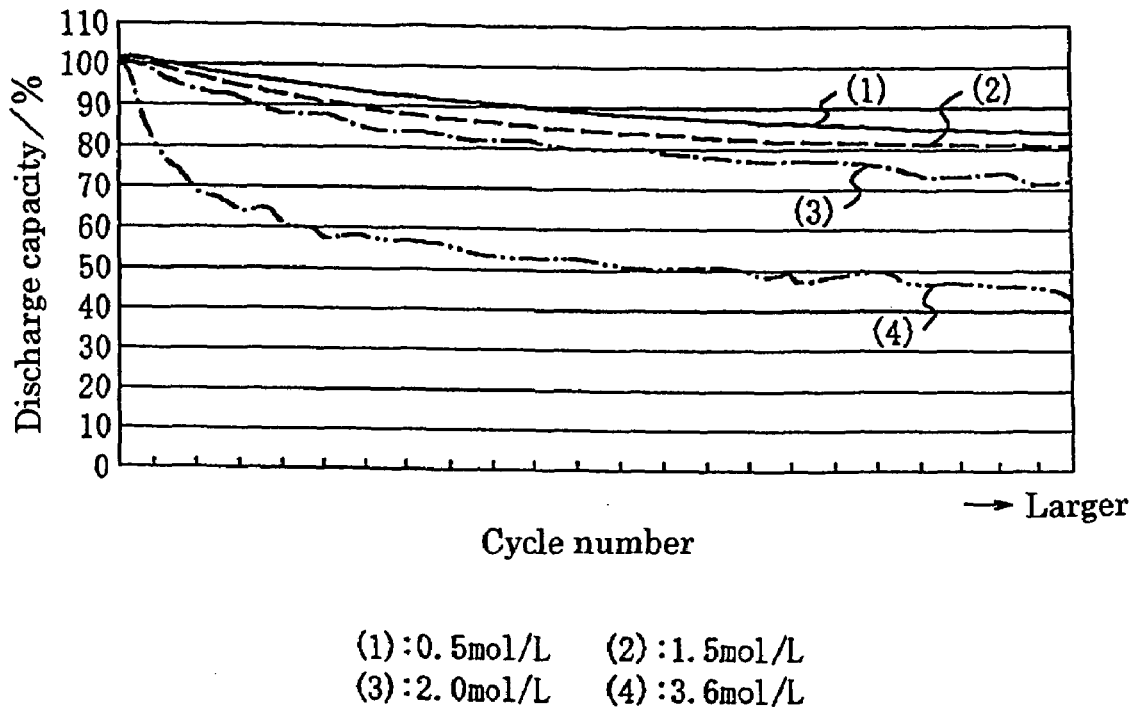
FIG. 6 is a graph showing variation in cycle properties for different sulfuric acid concentrations.
Figure 7:
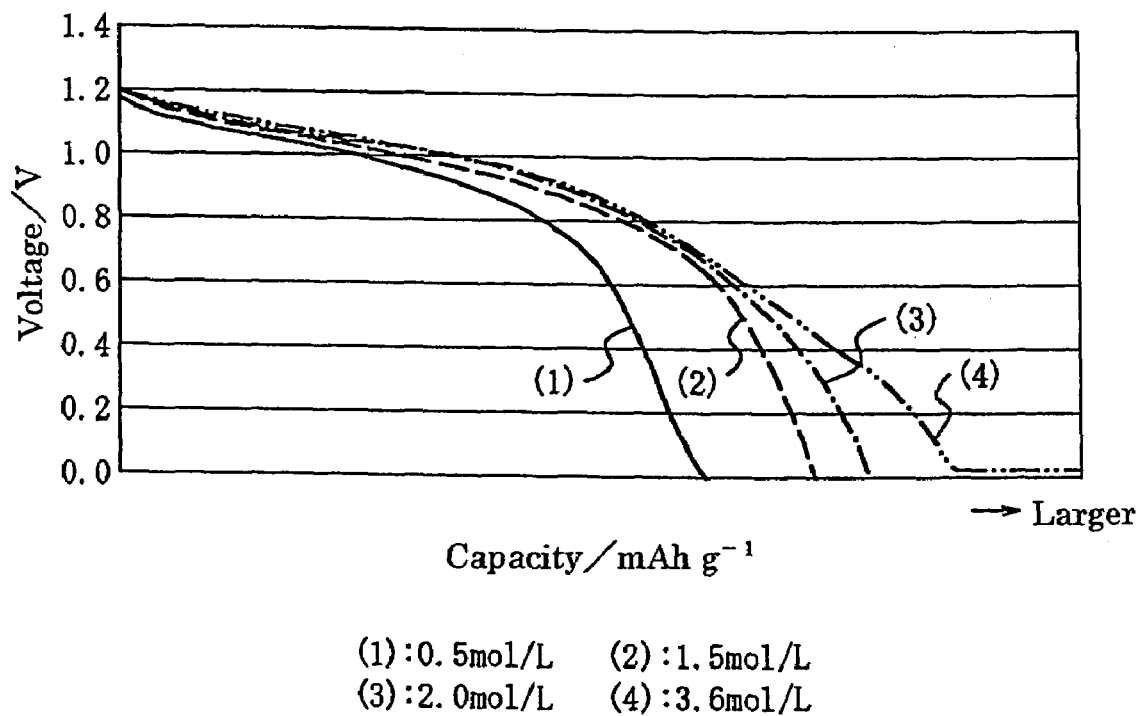
FIG. 7 is a graph showing variation in an appearance capacity for different sulfuric acid concentrations.

FIGS. 4 and 5 show the evaluation results of Examples 1, 3, 5, 7, 14 and 19 and Comparative Examples 1 and 2 for cycle properties and cell internal resistance variation ratio. As seen from discharge capacity variation in FIG. 4, as the cycle number increased, a discharge capacity was reduced to 80% and 65% in Comparative Examples 1 and 2, respectively, while discharge capacities in Examples were less reduced to 83% to 96%. It indicates that a discharge capacity is less varied in Examples.

As seen from cell internal resistance variation ratio in FIG. 5, cell internal resistance variation ratios in Examples 1, 3, 7, 14 and 19 were 105 to 118%, while cell internal resistance variation ratios in Comparative Examples 1 and 2 were 121% and 138%, respectively. It indicates that cell internal resistance variation in Examples is less than that in Comparative Example 1 or 2.

These results show that this invention can improve cycle properties while inhibiting reduction in an appearance capacity.

Although these Examples employ indole trimer or polyphenylquinoxaline as an active material, an active material is not limited to those, but any active material having proton conductivity may be suitably used.

What is claimed is:

1. An electrode for an electrochemical cell, comprising:
an electrode material including an active material having a proton-conducting compound and a nitrogen-containing heterocyclic compound;
wherein the nitrogen-containing heterocyclic compound is one or more compounds selected from the group consisting of imidazole or its derivative represented by formula (1), triazole or its derivative represented by formula (2) or (3), and pyrazole or its derivative represented by formula (4):

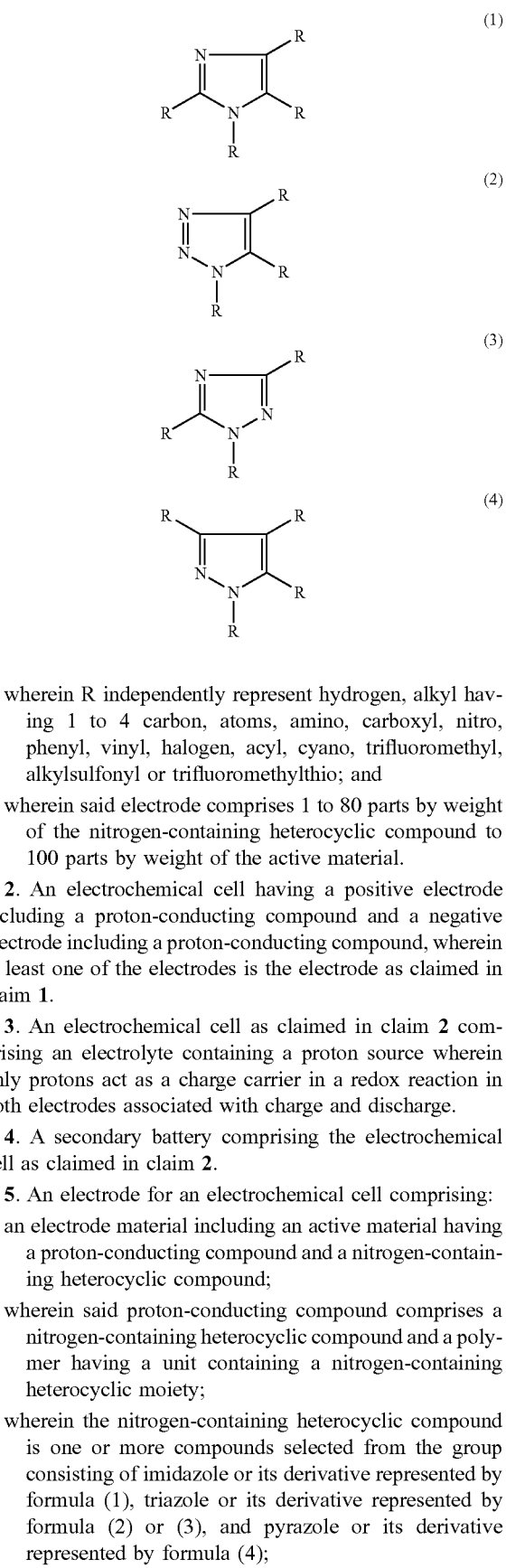

wherein R independently represent hydrogen, alkyl having 1 to 4 carbon, atoms, amino, carboxyl, nitro, phenyl, vinyl, halogen, acyl, cyano, trifluoromethyl, alkylsulfonyl or trifluoromethylthio; and wherein said electrode comprises 1 to 80 parts by weight of the nitrogen-containing heterocyclic compound to 100 parts by weight of the active material.

2. An electrochemical cell having a positive electrode including a proton-conducting compound and a negative electrode including a proton-conducting compound, wherein at least one of the electrodes is the electrode as claimed in claim 1.

3. An electrochemical cell as claimed in claim 2 comprising an electrolyte containing a proton source wherein only protons act as a charge carrier in a redox reaction in both electrodes associated with charge and discharge.

4. A secondary battery comprising the electrochemical cell as claimed in claim 2.

5. An electrode for an electrochemical cell comprising:
an electrode material including an active material having a proton-conducting compound and a nitrogen-containing heterocyclic compound;
wherein said proton-conducting compound comprises a nitrogen-containing heterocyclic compound and a polymer having a unit containing a nitrogen-containing heterocyclic moiety;
wherein the nitrogen-containing heterocyclic compound is one or more compounds selected from the group consisting of imidazole or its derivative represented by formula (1), triazole or its derivative represented by formula (2) or (3), and pyrazole or its derivative represented by formula (4);

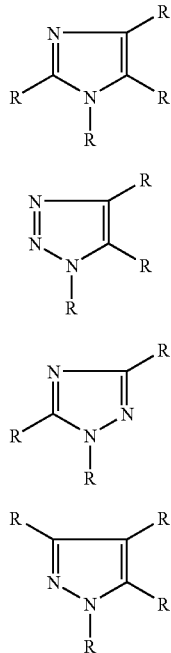

(1)
(2)
(3)
(4)

wherein R independently represent hydrogen, alkyl having 1 to 4 carbon atoms, amino, carboxyl, nitro, phenyl, vinyl, halogen, acyl, cyano, trifluoromethyl, alkylsulfonyl or trifluoromethylthio; and wherein said electrode comprises 1 to 80 parts by weight of the nitrogen-containing heterocyclic compound to 100 parts by weight of the active material.

6. The cell electrode as claimed in claim 5 comprising 1 to 80 parts by weight of the nitrogen-containing heterocyclic compound and the polymer to 100 parts by weight of the active material.

7. An electrochemical cell having a positive electrode including a proton-conducting compound and a negative electrode including a proton-conducting compound, wherein at least one of the electrodes is the electrode as claimed in claim 5.

8. The electrochemical cell as claimed in claim 7 comprising an electrolyte containing a proton source wherein only protons act as a charge carrier in a redox reaction in both electrodes associated with charge and discharge.

9. The electrochemical cell as claimed in claim 7, wherein the electrochemical cell is arranged in a secondary battery.

10. A secondary battery comprising an electrochemical cell having at least two electrodes:
wherein at least two of the electrodes of the electrochemical cell comprise an electrode material including an active material having a proton-conducting compound;
wherein at least one electrodes of the electrochemical cell comprises an electrode material including a nitrogen-containing heterocyclic compound;
wherein the nitrogen-containing heterocyclic compound comprises one or more compounds selected from the group consisting of imidazole, triazole, pyrazole, and their derivatives; and
wherein said electrode material comprises the nitrogen-containing heterocyclic compound and a polymer having a unit containing a nitrogen-containing heterocyclic moiety.

11. An electrochemical cell, comprising:
a negative electrode including an active material having a proton-conducting compound and a nitrogen-containing heterocyclic compound, the negative electrode being formed on a negative current collector;
a positive electrode;
a separator separating the positive electrode and the negative electrode;
wherein the nitrogen-containing heterocyclic compound is one or more compounds selected from the group consisting of imidazole or its derivative represented by formula (1), triazole or its derivative represented by formula (2) or (3), and pyrazole or its derivative represented by formula (4):

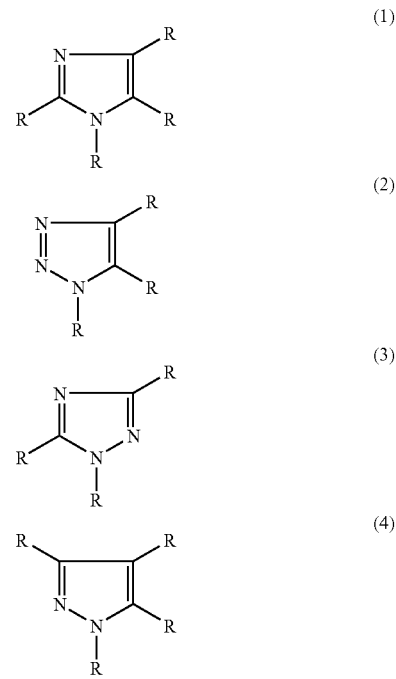

(1)
(2)
(3)
(4)

wherein R independently represent hydrogen, alkyl having 1 to 4 carbon atoms, amino, carboxyl, nitro, phenyl, vinyl, halogen, acyl, cyano, trifluoromethyl, alkylsulfonyl or trifluoromethylthio; and wherein the negative electrode comprises 1 to 80 parts by weight of the nitrogen-containing heterocyclic compound to 100 parts by weight of the active material.

12. An electrochemical cell, comprising:
a positive electrode including an active material having a proton-conducting compound and a nitrogen-containing heterocyclic compound, the positive electrode being formed on a positive current collector;
a negative electrode;
a separator separating the positive electrode and the negative electrode;
wherein the nitrogen-containing heterocyclic compound is one or more compounds selected from the group consisting of imidazole or its derivative represented by formula (1), triazole or its derivative represented by formula (2) or (3), and pyrazole or its derivative represented by formula (4):

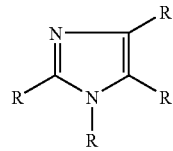

(1)

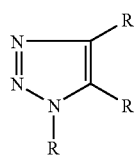

(2)

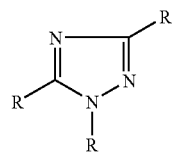

(3)

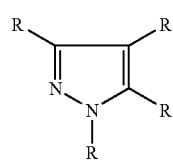

(4)

wherein R independently represent hydrogen, alkyl having 1 to 4 carbon atoms, amino, carboxyl, nitro, phenyl, vinyl, halogen, acyl, cyano, trifluoromethyl, alkylsulfonyl or trifluoromethylthio; and wherein the positive electrode comprises 1 to 80 parts by weight of the nitrogen-containing heterocyclic compound to 100 parts by weight of the active material.

13. A n electrochemical cell, comprising:

an electrode material including an active material having a proton-conducting compound and a nitrogen-containing heterocyclic compound;

wherein only protons act as a charge carrier in a redox reaction in both electrodes associated with charge and discharge;

wherein the electrochemical cell comprises an electrolyte containing a proton source, and wherein only adsorption and desorption of protons in the electrode active material is involved in electron transfer in a redox reaction in both electrodes associated with charge and discharge;

wherein the nitrogen-containing heterocyclic compound is one or more compounds selected from the group consisting of imidazole or its derivative represented by formula (1), triazole or its derivative represented by formula (2) or (3), and pyrazole or its derivative represented by formula (4):

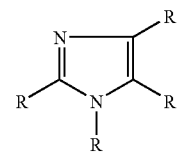

(1)

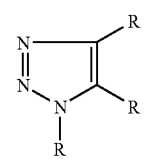

(2)

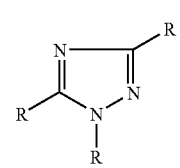

(3)

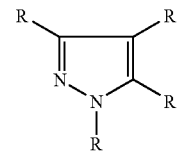

(4)

wherein R independently represent hydrogen, alkyl having 1 to 4 carbon atoms, amino, carboxyl, nitro, phenyl, vinyl, halogen, acyl, cyano, trifluoromethyl, alkylsulfonyl or trifluoromethylthio; and wherein the electrode material comprises 1 to 80 parts by weight of the nitrogen-containing heterocyclic compound to 100 parts by weight of the active material.

* * * * *